United States Patent
Huang

(10) Patent No.: US 8,599,757 B2
(45) Date of Patent: Dec. 3, 2013

(54) PLUG-AND-PLAY WIRELESS NETWORK EXTENSION SYSTEM AND METHOD OF AUTOMATIC CONNECTION FOR THE SAME

(75) Inventor: Wu-Sheng Huang, Taipei (TW)

(73) Assignees: Wu-Sheng Huang, Taipei (TW); Napuda Technology Co., Ltd., Taipei (TW)

(*) Notice: Subject to any disclaimer, the term of this patent is extended or adjusted under 35 U.S.C. 154(b) by 311 days.

(21) Appl. No.: 13/089,004

(22) Filed: Apr. 18, 2011

(65) Prior Publication Data
US 2012/0044863 A1 Feb. 23, 2012

(30) Foreign Application Priority Data
Aug. 20, 2010 (TW) ................. 99127993 A

(51) Int. Cl.
*H04W 4/00* (2009.01)
(52) U.S. Cl.
USPC .......................................................... 370/328
(58) Field of Classification Search
USPC ................... 370/328, 468, 257; 375/257, 219
See application file for complete search history.

(56) References Cited

U.S. PATENT DOCUMENTS

| | | | | |
|---|---|---|---|---|
| 2007/0002772 A1* | 1/2007 | Berkman et al. | ............... | 370/257 |
| 2007/0201540 A1* | 8/2007 | Berkman | ............... | 375/219 |
| 2009/0174532 A1* | 7/2009 | Galli et al. | ............... | 340/310.11 |
| 2010/0226391 A1* | 9/2010 | Miyazaki et al. | ............... | 370/468 |
| 2012/0183084 A1* | 7/2012 | Galli et al. | ............... | 375/257 |

* cited by examiner

*Primary Examiner* — Albert T Chou
(74) *Attorney, Agent, or Firm* — Li & Cai Intellectual Property (USA) Office

(57) ABSTRACT

Provided is a plug-and-play wireless network extension system and a method of automatic connection for the system. The system at least has a wireless Ethernet extension controller and at least one wireless Ethernet extension station. The controller and the station preferably adopt a power-line communication technology to accomplish an initial connection and data transferring. While the connection is done, an automatic connection process is initiated. By means of an automatic exploration mechanism to search any existed wireless Ethernet extension controller, the station obtains the controller's network address. The station then automatically establishes the connection and receives the wireless network configuration from the controller. It is featured that the system achieves a plug-and-play effect to simplify the process for expanding the coverage of wireless signals.

20 Claims, 11 Drawing Sheets

PLUG-AND-PLAY WIRELESS NETWORK EXTENSION SYSTEM AND METHOD OF AUTOMATIC CONNECTION FOR THE SAME

BACKGROUND OF THE INVENTION

1. Field of the Invention

The instant disclosure relates to a plug-and-play wireless network extension system and an automatic connection method thereof, more particularly to the system formed of an extension controller having automatic exploration and configuration, and one or more extension stations.

2. Description of Related Art

In a general technology, several ways are provided to extend the coverage of wireless network. One of the ways is to configure an Ethernet network and to extend by multiple wireless stations. Therefore, a wider wireless coverage of a LAN may be accomplished and provide a much broader wireless network service.

According to one of the conventional arts, in order to cover a specific range of the wireless LAN, the each wireless network station needs to be configured at the same way in addition to the disposal of multiple wireless network stations. The related flow is referred to FIG. 1.

FIG. 1 illustrates a scheme to extend the coverage of the wireless network according to the conventional art. The shown multiple wireless network stations, such as the stations A, B, C, are provided.

In step S100, a wireless network configuration related to the wireless network station A is configured firstly. The configuration may include configuration to the physical network, such as the connection setting of ADSL. Some further wireless network settings, including SSID, signal channel, network gateway, and security code, are also required. Thus, the user equipment around the wireless network station A may receive the wireless signals from the station. The mentioned wireless network configuration is therefore introduced into the wireless network station A.

Next, in step S110, in consideration with extension the coverage of wireless signals or increment of the number of connection channels, the Ethernet network may be configured to be the connection for bridging the wireless network station A and the wireless network station B. Meanwhile, in step S120, the wireless network station B may be manually configured with the same wireless network configuration. In practice, the configuration for connection is performed through a setting screen that is the wireless network configuration for the wireless network station A being manually performed as for the wireless network station B. After that, the users close to the wireless network station B may also receive the signals around the wireless network station B. The wireless network configuration may be used for other network area through a gateway configuration.

Such as step S130, the Ethernet network is configured to be the channel for data transmission between the wireless network station A and the wireless network station C. In which, the wireless network station C can be manually configured to have the same configuration with the station A. That is, in next step S140, the configuration for the wireless network station A is manually configured to be the same configuration with the wireless network station C. The users near the wireless network station C may also receive the signals from the wireless network station C, and use the wireless network configuration to the wireless network station C for broader coverage.

However, the above described steps for performing the configuration need to be repeatedly processed as the network coverage increases, or even any modification to the configuration. The drawbacks of this conventional scheme include:

Network administrator needs to set up the physical Ethernet network among the wireless network stations;

Network administrator needs to set up the every station to have the same wireless network configuration and the related parameters manually;

Mistakes are easily caused to the manual setting with the wireless network configuration and network security parameters for the every station;

The parameters are required to be modified manually as the wireless network configuration changes; the network administrator has no effective way to monitor the operational status of each wireless network station.

Further, in order to reduce the cost of the Ethernet network layout or construction, a power-line network transmission may be employed. The power line is used to be the transmission channel among the wireless stations.

FIG. 2 shows a schematic diagram of the conventional LAN, and FIG. 3 illustrates a flow chart thereof.

In the current example, the mentioned power-line network is the scheme to extend the wireless signals. A set of specific wireless network configuration is firstly performed to the wireless network station A (step S300). The users near the wireless network station A may therefore receive the wireless signals from the station A, and thereby connect with the wireless network station A using the wireless network configuration.

Then a connection from a power-line network bridge A1 to the wireless network station A is established, such as step S310. This power-line network bridge A1 allows the data delivered over the power loop. Further, this bridge A1 is functioned to allow the other network devices to be communicated with each other over the power line.

After that, the network configuration for the wireless network station B is manually performed (step S320). It means that the wireless network configuration for the wireless network station A is also performed onto the wireless network station B. The users near the wireless network station B may receive the wireless signals. Also, the wireless network configuration is provided to connect to the wireless network station B.

The wireless network station B is then connected with a power-line network bridge B1, such as step S330. Through this power-line network bridge B1, the wireless network station B is able to establish a connection to the wireless network station A over the power loop for data transmission.

Next, the wireless network station C is required to have the same wireless network configuration by manual operation, such as description in step S340. The mentioned wireless network configuration is copied from the wireless network station A. Thus the users near the wireless network station C may link to the station C with the prepared wireless network configuration.

The wireless network station C may then connect to a power-line network bridge C1, such as in S350. The station C may transmit data to the stations A and B over the power line through the power-line network bridge C1.

However, the above mentioned conventional art in FIG. 2 and FIG. 3 may exist some following drawbacks:

The network administrator needs to manually set up every wireless network station with the same wireless network configuration and any security parameter.

The manual setting of the wireless network configuration or any parameter may easily cause human error.

The parameters for the wireless station are required to be modified manually when the wireless network configuration is updated.

The network administrator has no effective way to monitor the operational statuses of the wireless stations in all.

SUMMARY OF THE INVENTION

In summation of the above described problem and drawbacks of the conventional art, a plug-and-play wireless network extension system and a method of automatic connection thereof in accordance with the instant disclosure are provided. The invention allows users to set up the wireless network configuration more easily and conveniently, and able to monitor the operational statuses of all the wireless stations.

According to one of the embodiments, the wireless network extension system primarily includes a wireless Ethernet extension controller. The controller includes a wireless network module for generating wireless signals, and an Ethernet network module for provision of wired network. Furthermore, a power-line network bridging module for carrying network data packets over a power line is included in the controller. The power-line network not only supplies power, but also delivering data. The controller also provides a user operation and configuration module which will launch an interface for administrator's access and maintenance. The controller further has a controller exploring communication module for communicated with other network devices, such as one or more stations or other like controllers.

In one more embodiment, the power-line network bridging module may be an external device which is accessible over a network link.

The wireless network extension system further includes one or more wireless Ethernet extension stations. Each station at least has a wireless network module for generating wireless signals, an Ethernet network module for wired connection, and a station exploring communication module for network exploring. An internal or external power-line network bridging module is also included for connecting to power supply or delivering data packets over the power line.

The wireless Ethernet extension controller and the wireless Ethernet extension station are connected through their inside controller exploring communication module and station exploring communication module. The exploring mechanism may be operated actively to explore the devices over the local area network established by the power-line or Ethernet. The each station may automatically perform the network configuration sent from the controller. Therefore, a plug-and-play feature without any further manual configuration can be accomplished.

To the wireless network extension system, an automatic connecting process is disclosed for achieving the plug-and-play feature.

At first, a network environment having the wireless Ethernet extension controller and the wireless Ethernet extension station is prepared. In one of the embodiments, the power-line network bridging modules on both controller and the station are configured to be interconnected.

Next, a wireless network configuration at wireless Ethernet extension controller is set. For example, a network administrator set up the wireless network configuration via a user operation and configuration module of the controller. The related configuration is then stored into the memory of the wireless Ethernet extension controller.

Since one or more wireless Ethernet extension stations within a network domain are disposed to connect a power supply, the power-line network bridging module in the station may apply the power-line communication (PLC) standard to form a communication network within the same power loop. After an initial initialization, the station exploring communication module in each station is used to establish a connection to the wireless Ethernet extension controller. In the meantime, the broadcast packets are used to explore the network address of the controller. According to the acquired network address, the wireless Ethernet extension station and the wireless Ethernet extension controller are connected.

In particular, over the connection there-between, the wireless Ethernet extension controller transmits the wireless network configuration to each wireless Ethernet extension station. The wireless network configuration is performed in the station for achieving the plug-and-play feature.

The disclosed network extension system in combination with the power-line communication technology may effectively extend the wireless network signals to much broader coverage. The plug-and-play feature also brings the users easily set up the wireless configuration and wireless network.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
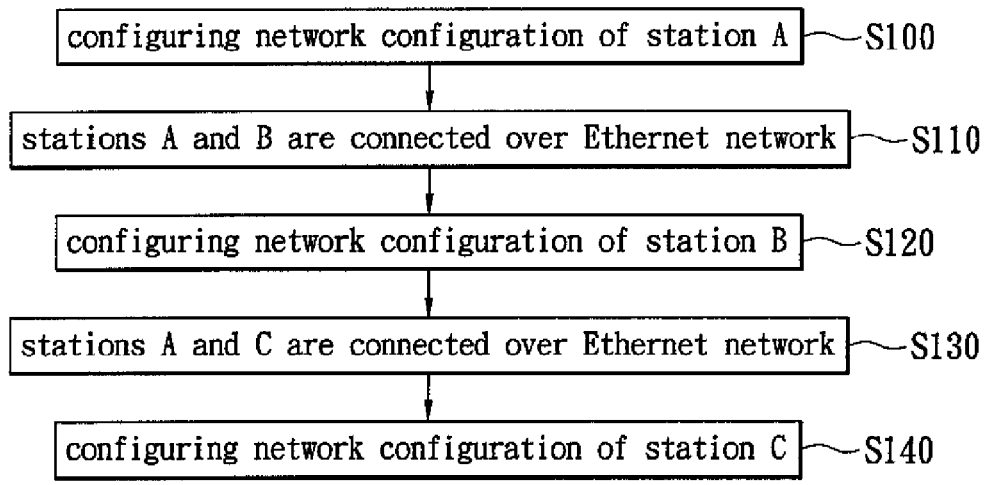
FIG. 1 illustrates a flow chart of setting wireless network configuration of the conventional technology.
Figure 2:
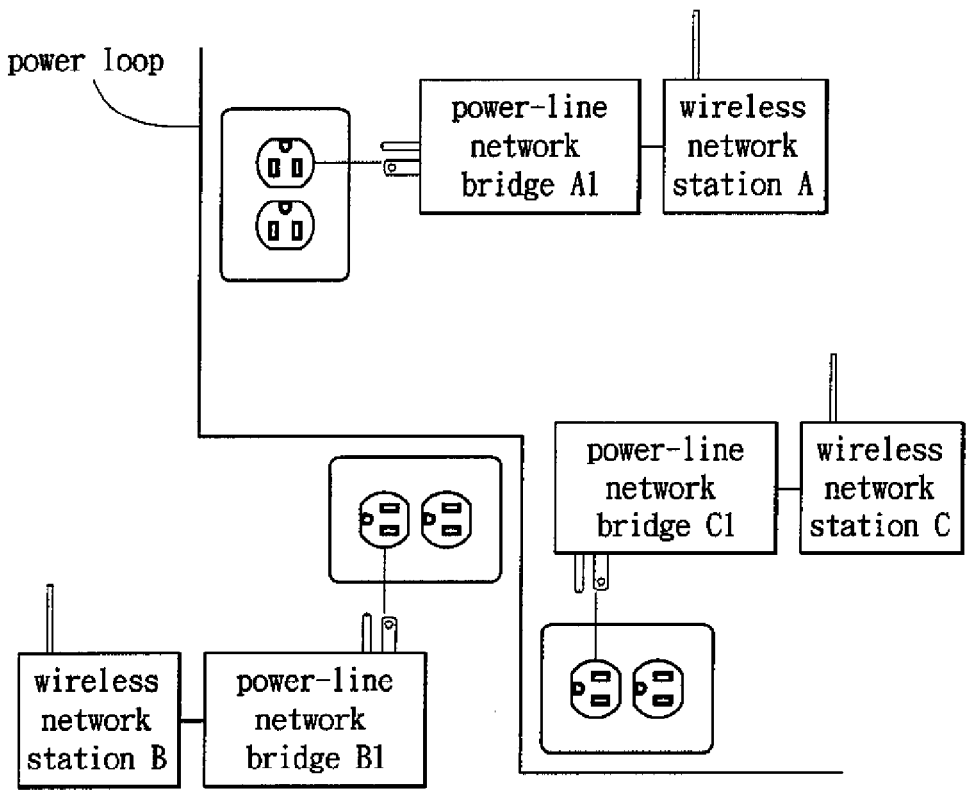
FIG. 2 is a layout diagram of bridging wireless network stations via a power-line network bridge according to the conventional technology.
Figure 3:
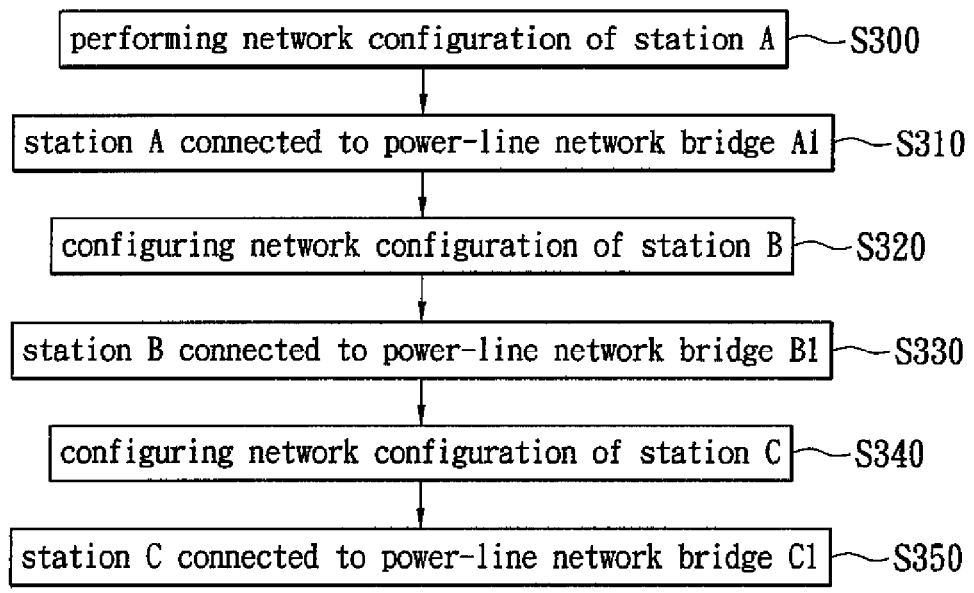
FIG. 3 is a flow chart illustrating a connection established over a power line according to the conventional technology.
Figure 4:
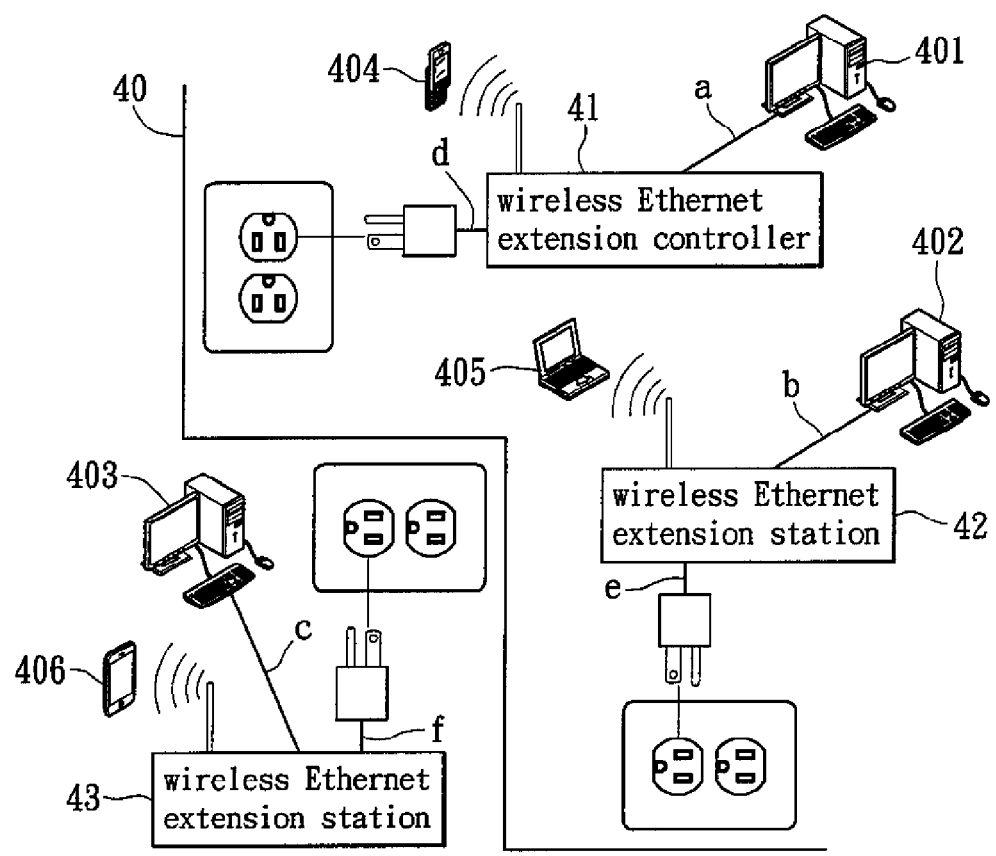
FIG. 4 shows a schematic diagram of one of the embodiments in accordance with the instant disclosure.

Reference is made to FIG. 4, one of the embodiments shows a schematic diagram of a network domain. One wireless Ethernet extension controller 41 and two wireless Ethernet extension stations 42, 43 are exemplarily shown in one power loop 40. The two stations are disposed at two different positions, for example, two different rooms at home, two different floors, or two different departments of a company. The shown wireless Ethernet extension controller 41 and the wireless Ethernet extension stations 42, 43 may connect to the various terminal devices 401, 402, 403, 404, 405, 406 via the network lines a, b, c or wireless signals. Further, these three wireless Ethernet extension devices respectively use the power d, e, f to connect to the power supply. Each device includes a circuit relating to a kind of power-line network bridge (powerline bridge), by which a power-line communication technology (PLC—Power Line Communication) is introduced to performing communication and data transmission.

The wireless signals generated by the wireless Ethernet extension controller 41 and the existed wired network create a network domain. The wireless Ethernet extension stations 42, 43 and the existed wired Ethernet network also provide a network coverage, especially to link the various terminal devices over the network cables a, b, c and other like over the power line.

The mentioned extension devices (41, 42, and 43) particularly integrate a feature of power-line network bridge. The power loop may therefore be regarded as a communication network. The wireless Ethernet extension controller 41 may establish a communication channel to the wireless Ethernet extension stations 42, 43 for data transmission.

According to the embodiment shown in FIG. 4, the power-line network is especially used to connect the multiple wireless Ethernet extension devices, and the each extension device (41, 42, 43) itself integrates the wireless signaling function and Ethernet network capability for extending both wired and the wireless access range. Since this system provides a scheme to extend wider network coverage, the wireless network workstation and Ethernet network workstation near the extension devices may conveniently share the same resources over the network.

Figure 5:
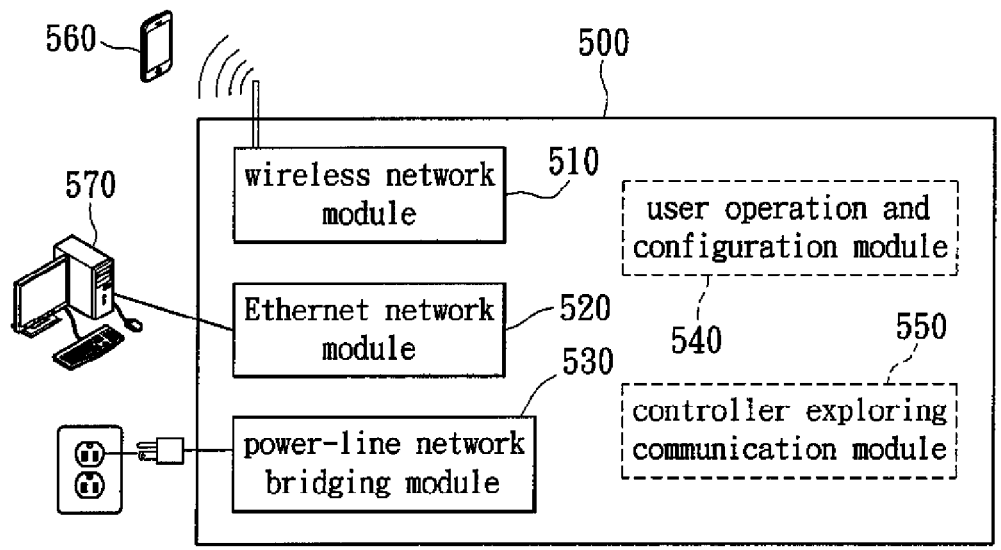
FIG. 5 shows a schematic diagram of one embodiment of a wireless Ethernet extension controller in accordance with the instant disclosure.

FIG. 5 exemplarily describes one embodiment of the inner design of the wireless Ethernet extension controller 41. The functional modules within the body 500 of the controller are described as follows.

A controller-end wireless network module 510 is used to provide a wireless network access service. The module 510 is a working module for the wireless network station for preparing a wireless environment for the terminal device 560.

A controller-end Ethernet network module 520 is an optional circuit module. The wireless Ethernet extension controller may not provide any wired connection service. However, this Ethernet network module 520 may be included to provide Ethernet network access service. The wired connection, as shown, is used to link to the terminal device 570 for bridging or routing network packets or routing;

A controller-end power-line network bridging module 530 is a bridge to link a power socket over a power line for the controller body 500. In addition to taking power through the socket, a power-line communication (PLC) standard is also introduced to communicate with the each Ethernet extension device, and also prepared for data transmission. In one further embodiment, the power-line network bridging module may be an external device, and the wireless Ethernet extension controller is able to link the power-line network bridging module over the Ethernet network.

A user operation and configuration module 540 is used to provide a management interface for users setting up the wireless network configuration. The management interface may also include a setting screen for security mechanism. The management interface may provide a function for users monitoring the operation status of the each wireless Ethernet extension station.

A controller exploring communication module 550 waits for any inquiry or request from any network device, such as from the wireless Ethernet extension station. The controller may therefore issue a message of inquiry, response, and transmit the wireless network configuration.

Figure 6:
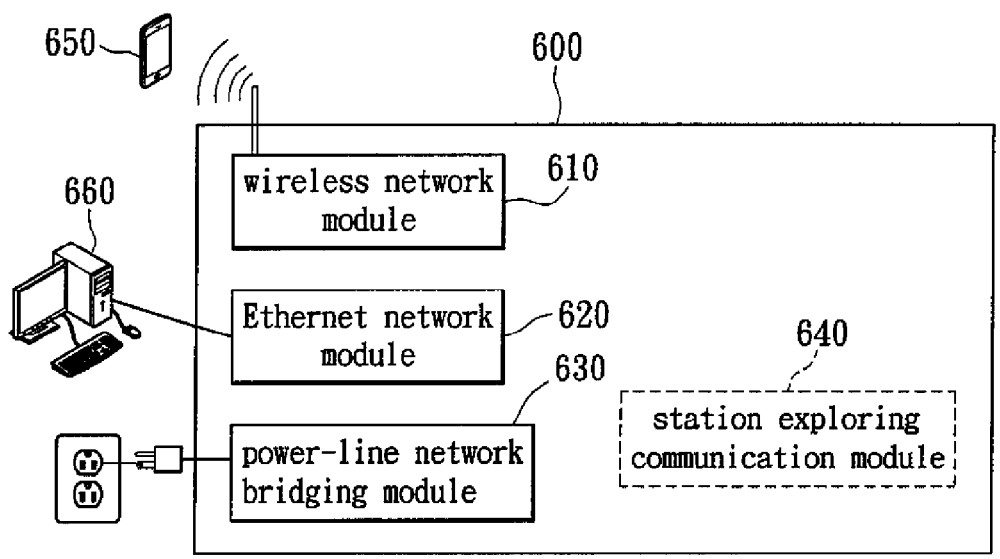
FIG. 6 shows a schematic diagram of the embodiment of a wireless Ethernet extension station in accordance with the instant disclosure.

FIG. 6 shows a schematic diagram of one embodiment of the wireless Ethernet extension station (42, 43) shown in FIG. 4. The modules within the station's body 600 are described as follows.

A station-end wireless network module 610 is included for providing wireless network access service. As shown, the wireless access service is for the terminal device 650.

A station-end Ethernet network module 620 is an optional module. It means the wireless Ethernet extension station may not able to have wired access service. The station, in one embodiment, includes an Ethernet network module 620 for access the network over the Ethernet network.

A station-end power-line network bridging module 630 is included. The wireless Ethernet extension station in accordance with the instant disclosure integrates the capability of power-line network through the power-line network bridging module 630. The station may connect to a power socket for taking power and establishing a communication link with the other devices over the power loop. In one further embodiment, the power-line network bridging module may be an external device.

A station exploring communication module 640 is provided for the wireless Ethernet extension controller to process inquiry, response, and retrieval of wireless network configuration.

The combination of the wireless Ethernet extension controller and the wireless Ethernet extension station constitutes a wireless network extension system. An automatic mechanism is further incorporated to performing an automatic connection process to function a plug-and-play feature. It is featured that the system may simplify the complex configuration for the network environment with multiple wireless stations.

More particularly, the automatic connecting mechanism applies the power-line communication technology to establishing a connection between the controller-end power-line network bridging module and the station-end power-line network bridging module. Furthermore, the broadcast packets for exploring and transmitting the wireless network configuration may be carried over the power line.

Furthermore, the automatic connecting mechanism and exploring process between the wireless Ethernet extension controller and the wireless Ethernet extension station may also be accomplished through the wired Ethernet network.

In accordance with the embodiment of the disclosure, the power-line communication technology is applied to the connection between the wireless Ethernet extension controller and the wireless Ethernet extension station. After the controller and the station connect to the power supply, they are within one power-line network domain. Then the station issues broadcast packets to explore the network address of the wireless Ethernet extension controller within the same network domain. Next, the wireless Ethernet extension controller acknowledges the broadcasting and transmits the wireless network configuration accordingly. The extension station then automatically sets up the wireless network configuration.

Figure 7A:
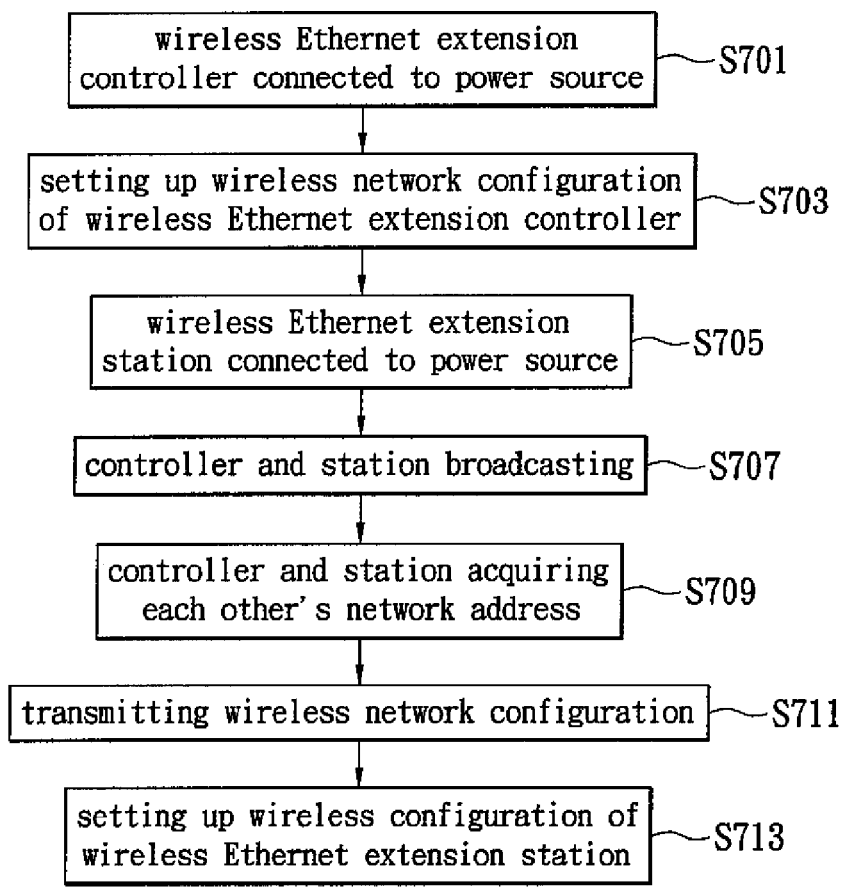
FIG. 7A is a flow chart illustrating the feature of plug and play of first embodiment in accordance with the instant disclosure.
Figure 7B:
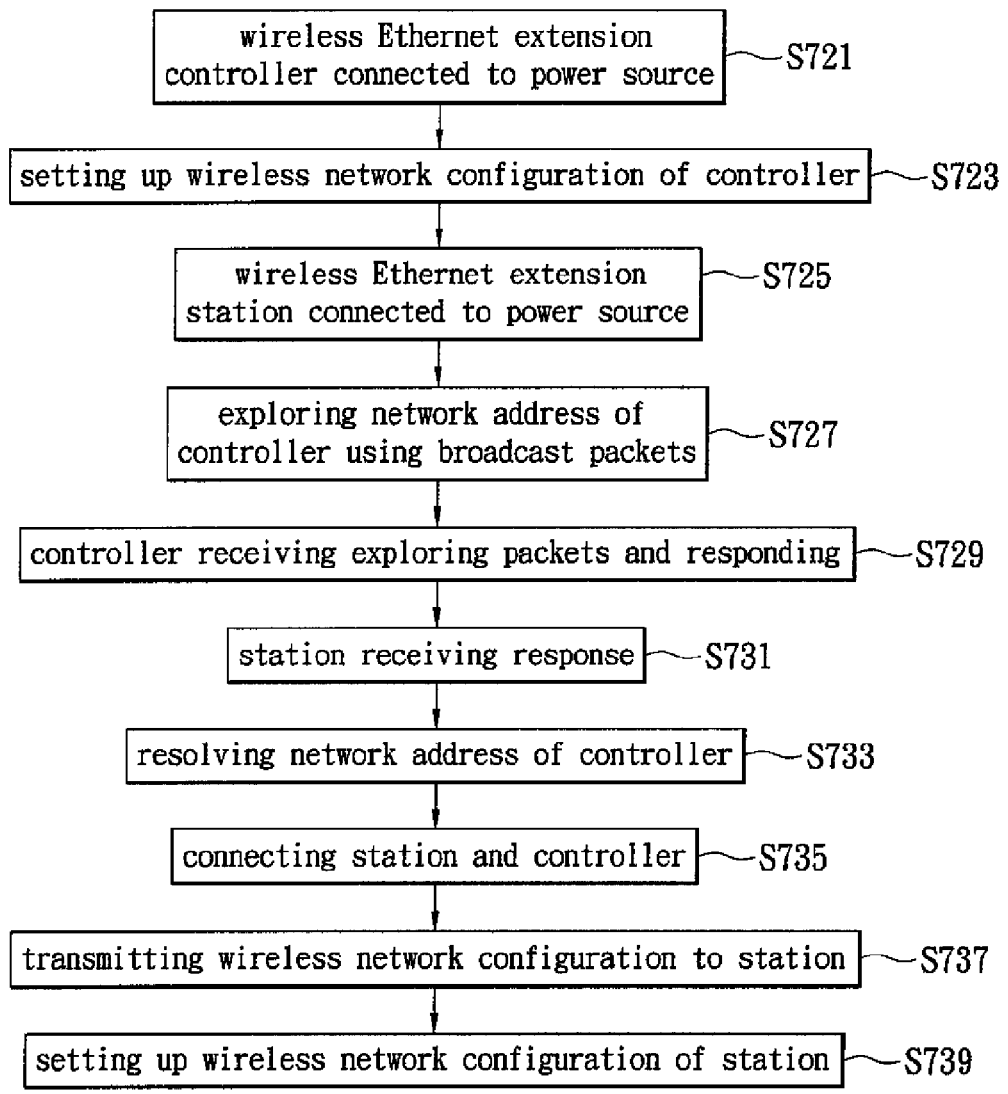
FIG. 7B is a flow chart illustrating the feature of plug and play of second embodiment in accordance with the instant disclosure.
Figure 7C:
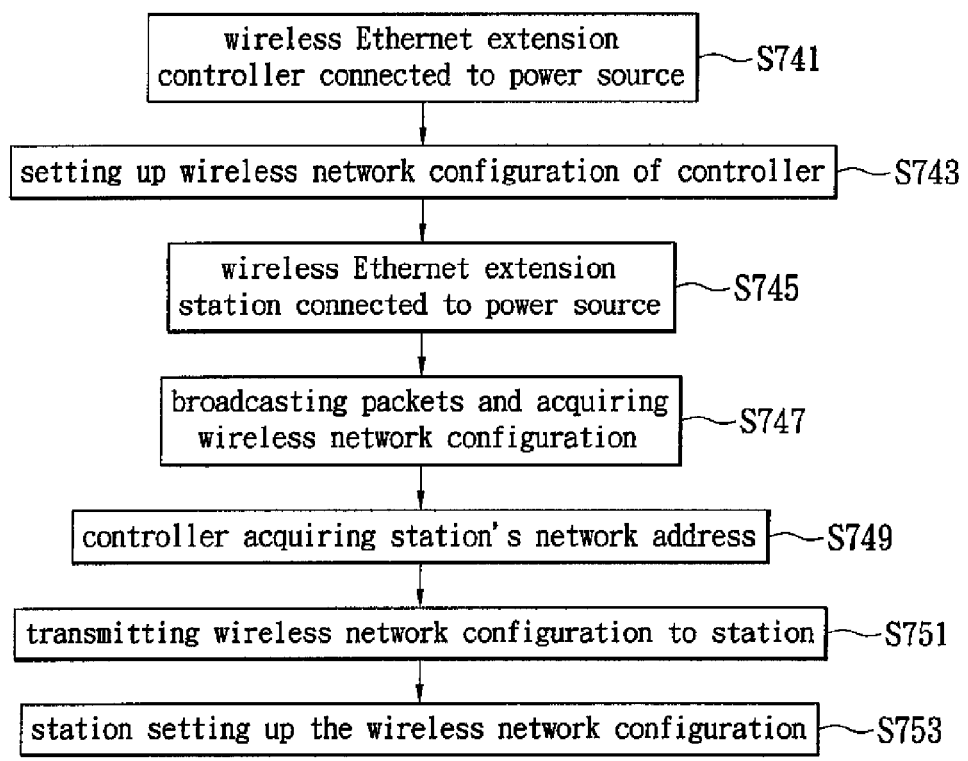
FIG. 7C is a flow chart illustrating the feature of plug and play of third embodiment in accordance with the instant disclosure.

The detail of the connection process with plug-and-play feature may be referred to flow charts described in FIGS. 7A, 7B and 7C.

FIG. 7A illustrates the flow chart of one of the embodiments. In which, the broadcast packets are employed to initiate the transmission of the wireless network configuration.

In the beginning of the steps, a network environment having the wireless Ethernet extension controller and at least one wireless Ethernet extension station is prepared. The wireless Ethernet extension controller uses its own power-line network bridging module to connect to a power supply (step S701). In addition to taking power from the power supply, the wireless Ethernet extension controller makes an electrical connection to the related power loop. The wireless Ethernet extension controller connects to a power socket via a power line. Therefore, the wireless Ethernet extension controller, such as the controller 500 shown in FIG. 5, has a network coverage over the whole power loop.

As in an initializing process, such as step S703, users may firstly set up the wireless network configuration to the wireless Ethernet extension controller. Next, in step S705, the wireless Ethernet extension station connects to the power supply through the power-line network bridging module (630). After the initialization is finished as powering on, in one embodiment, the controller provides a web server by which the users may access the network configuration of the controller through a web page. However, the invention may not be limited to the current embodiment, but also the other possible methods for setting up the configuration, exemplarily via a command line. Preferably the users may set up the wireless network configuration including SSID (Service Set Identifier), selection of wireless frequency channel, selection of communication protocol such as WiFi 802.11a/b/g, 802.11n, selection of transmission encryption, filtering of wireless authentication method, MAC (Media Access Control) address. The above parameters constitute the wireless network configuration and are stored in a memory of the wireless Ethernet extension controller. The stored configuration is prepared for the controller exploring communication module (550) transmitting the wireless network configuration to the connected wireless Ethernet extension station.

Next, both the wireless Ethernet extension controller and the wireless Ethernet extension station issue broadcast packets to the network devices in compliance with the power-line communication technology (step S707). When the wireless Ethernet extension station and controller acknowledge each other's network address (step S709). The controller then transmits the wireless network configuration according to the explored network address (step S711). The wireless Ethernet extension station especially receives the wireless network configuration through its own power-line network bridging module over the power line, and next performs the network configuration automatically (step S713).

The further process is described in accordance with the flow chart shown in FIG. 7B. At first, the mentioned wireless Ethernet extension controller and the wireless Ethernet extension station are prepared to establish a network environment. The wireless Ethernet extension controller is connected to a power supply through its power-line network bridging module (step S721). The controller is then connected with a power loop electrically. This step allows the wireless Ethernet extension controller (500, FIG. 5) to connect to the power socket via a power line, and to extend its wireless signal coverage over the power loop.

The wireless network configuration for the wireless Ethernet extension controller is then performed in step S723. The user operation and configuration module (540) of the controller is particularly provided for the users setting up the wireless network configuration. Therefore, this network domain ranges over a wireless network, an Ethernet network, and a power-line network built by the wireless Ethernet extension controller (500).

In step S725, the wireless Ethernet extension station is also connected to the power source via its power-line network bridging module (630). This step allows the wireless Ethernet extension station (600, FIG. 6) to take power via the connected power socket, and to form a communication network using the power loop in compliance with the power-line communication technology. This power-line communication technology is served to reduce the complex as building the traditional Ethernet network.

As powering on the wireless Ethernet extension station, an initialization is performed. An automatic connecting scheme is employed to connect with the controller (500) according to the power-line communication technology. While the connection there-between is established, the station then starts to broadcast packets over the network. The broadcast packets, initiated by the exploring communication module, are used to handshake with the wireless Ethernet extension controller. In particular, the power-line network is operated as a communication media. The station exploring communication module (640) uses the broadcast packets to explore the network address of the wireless Ethernet extension controller (500) (step S727). The network address of the controller can be acknowledged by the station by broadcasting the exploring packets. Once the wireless Ethernet extension controller discovers any exploring broadcast packet, the controller may respond the exploring packet (step S729). When the wireless Ethernet extension station receives the response from the exploring communication module (550) of the wireless Ethernet extension controller (step (step S731), the MAC address or Internet network address (IP address) of the controller (500) may be resolved accordingly (step S733).

Based on the acquired network address, a connection process is then performed. Including the power-line or via the Ethernet network, the network address is used to established the interconnection between the wireless Ethernet extension station(s) and the wireless Ethernet extension controller (step S735). The wireless Ethernet extension controller immediately transmits the wireless network configuration to any connected wireless Ethernet extension station (step S737). Exemplarily, the controller exploring communication module (550) of the wireless Ethernet extension controller (500) is activated to transmit the wireless network configuration, especially to the station exploring communication module (640) activated by the wireless Ethernet extension station (600). For provision of wireless network service, the wireless Ethernet extension station then uses the wireless network configuration to set up its wireless network module (610), including to apply the same wireless network parameters to the station in order to connect to the controller (500) with the same configuration (step S739).

The above-described automatic connection scheme is provided for automatically performing the wireless network configuration and exploring the network address of the wireless Ethernet extension controller (500) by the station exploring communication module (640) while the multiple wireless Ethernet extension stations (600) may connect to the power supply through their power-line network bridging modules (630). After the network address is acknowledged, the controller exploring communication module (550) is activated to establish the connection with the stations. These stations may automatically receive the wireless network configuration, and automatically set up the wireless network module (510). Thus the plug-and-play is functioned. The coverage of the network domain may be extended with the increment of number of the wireless Ethernet extension stations. The wireless network users and Ethernet network users may therefore connect to the same network domain.

FIG. 7C illustrates a flow of one further embodiment of the disclosure. The wireless Ethernet extension controller is firstly connected to a power supply (step S741). An initializing step is then performed. The users may afterward manipulate an interface to set up the network configuration (step S743). The wireless Ethernet extension station utilizes the power-line network bridging module to connect to the power source (step S745). The wireless Ethernet extension controller stays at the same network domain with the station(s).

The wireless Ethernet extension station is initialized as powering on. Further, the station will actively broadcast packets to send request over the power-line network before the connection is established. The broadcasted packets carry the message of requesting the wireless network configuration (step S747).

When the wireless Ethernet extension controller receives the broadcast packet, the network address of the station can be resolved, and the request of the wireless network configuration can be acknowledged (step S749). Next, such as step S751, the wireless Ethernet extension controller actively transmits the wireless network configuration to the wireless Ethernet extension station. Preferably, the configuration is, but not limited to be, delivered through broadcast packets. The single-network destination scheme, such as unicast method, may be used to deliver the configuration. The wireless Ethernet extension station may be set up its wireless network module (610) as receiving the wireless network configuration. The wireless network configuration includes a set of network parameters applied to the network module (step S753). The automatic configuration may achieve the plug-and-play feature for the whole network domain.

To sum up the above-described embodiments, the wireless signal coverage of the controller can be extended wider because of the disposal of the one or more stations. If any new wireless Ethernet extension station is added within this domain, the above steps can be repeated for automatically setting up the wireless network module of the station. The controller and its connected stations may together establish a network domain, which ranges over the wireless network and the Ethernet network.

Next, each terminal device, such as an Ethernet workstation, may extend its signals to the network domain including wireless or/and wired networks which are prepared through the wireless Ethernet extension controller and the interconnected wireless Ethernet extension station(s). When the Ethernet workstation is connected with the any wireless Ethernet extension station within the domain, the workstation enters the coverage of the network.

Figure 8:
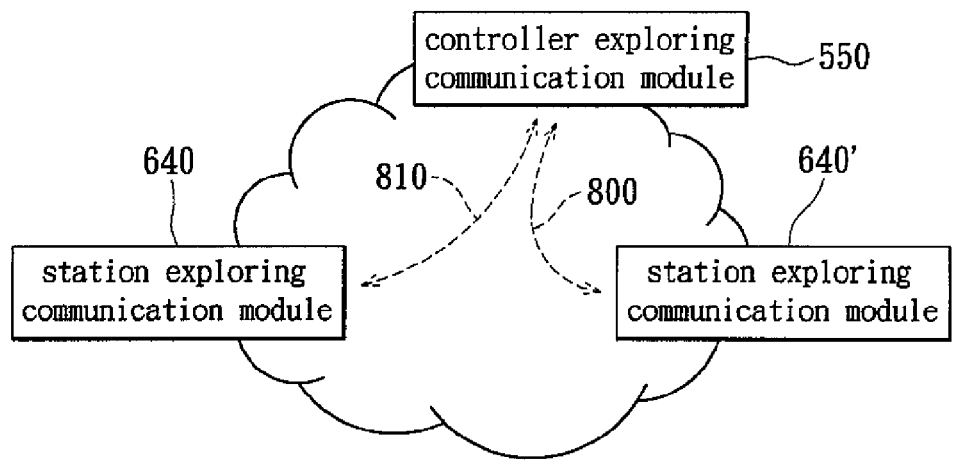
FIG. 8 schematically shows the connection between the controller-end and the station-end exploring communication module.

Reference is made to FIG. 8 depicting a schematic diagram of the exploring communication module.

In the current embodiment, the wireless Ethernet extension station (600, FIG. 6) adopts a flow chart which is able to achieve plug-and-play feature. It is noted that the shown station exploring communication modules (640, 640') may automatically be the physical communication medium over the network, including the power-line network and Ethernet network. The main embodiment allows the devices within the same network to explore each other through the power-line communication technology. The broadcast packets are preferably used to explore the devices. One of the objectives of the instant disclosure is to discover and find out the network address of the wireless Ethernet extension controller (500, FIG. 5).

Once the station exploring communication module (640 or 640') receives the response from the controller exploring communication module (550), the network address of the controller can be acknowledged, and thereby build the connection (800). Over the connection (800), the controller delivers the wireless network configuration, and responds the inquiry of operational status of the wireless Ethernet extension controller.

Figure 9:
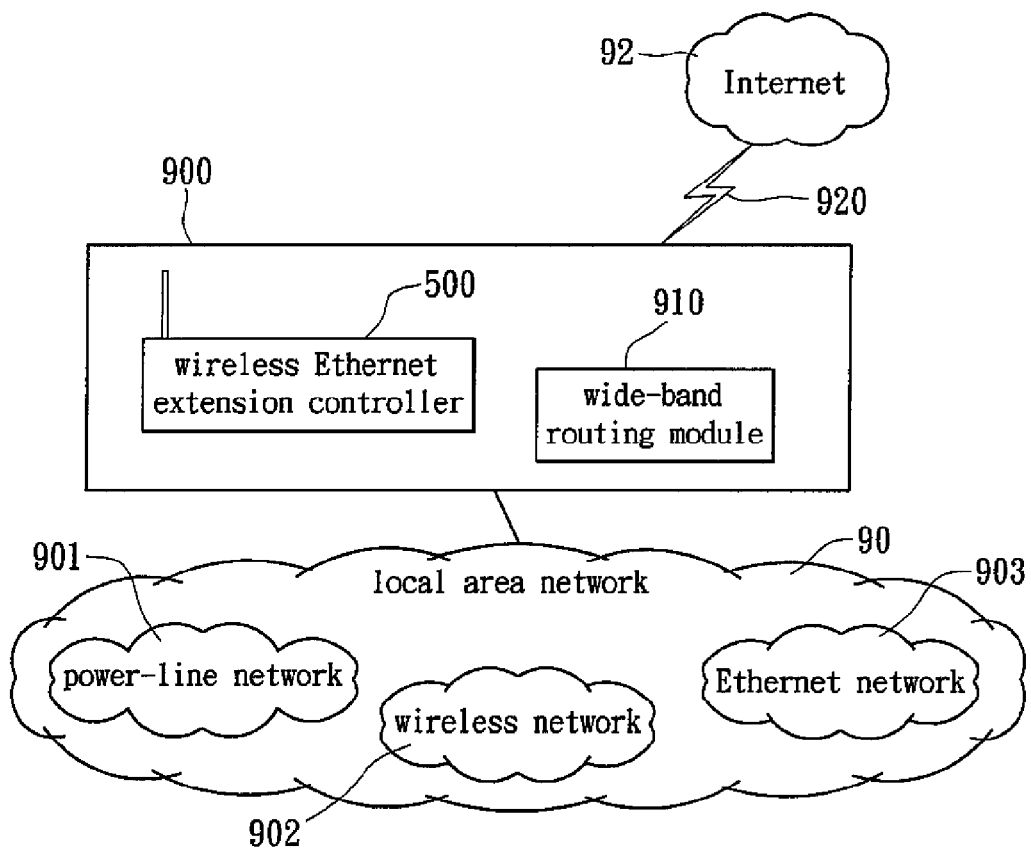
FIG. 9 schematically describes the wireless Ethernet extension controller combined with a routing module of one embodiment in accordance with the instant disclosure.

FIG. 9 depicts a schematic diagram of the wireless Ethernet extension controller with a routing module.

A shown device 900 is to integrate the disclosed wireless Ethernet extension controller 500 with a wide-band routing module 910. The wide-band routing module 910 is primarily in charge of connecting to the line 920 for Internet, providing service of DHCP (Dynamic Host Configuration Protocol), network address translation (NAT), firewall, and provision of Point-to-Point Protocol over Ethernet.

Through the network service of wide-band routing module 910, the users of a power-line network 901 within the network domain 90, wireless network 902, and the Ethernet network 903 may acquire an internal network address (IP), and then link to Internet (92) by NAT technology.

One more module of the device 900 is the circuit of the wireless Ethernet extension controller 500, which is used to extend the coverage of the local area network. A combination of a power-line network, wireless network and Ethernet network is therefore formed as a local area network through a plurality of wireless Ethernet extension stations (not shown in the present figure).

Figure 10:
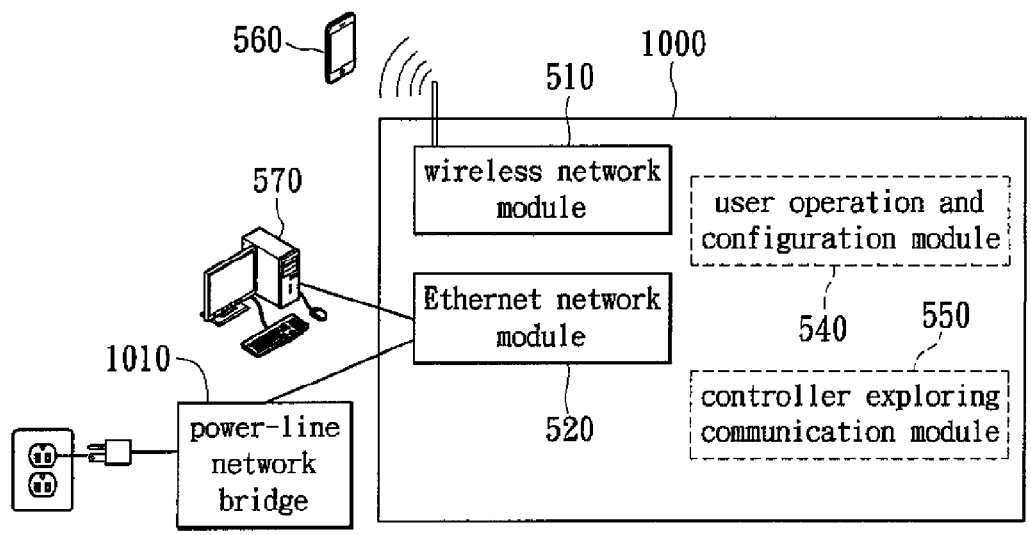
FIG. 10 describes another embodiment of the wireless Ethernet extension controller in accordance with the instant disclosure.
Figure 11:
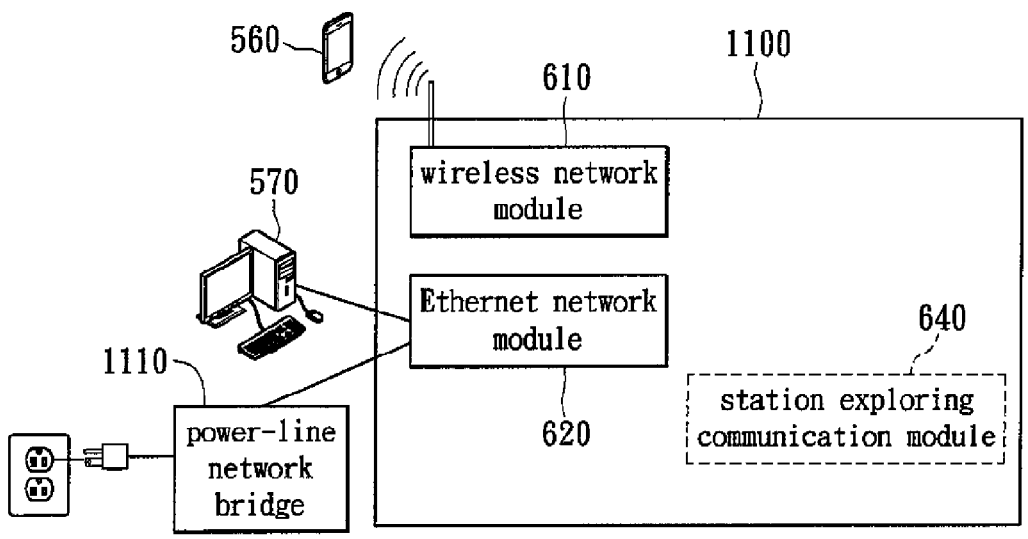
FIG. 11 describes another embodiment of the wireless Ethernet extension station in accordance with the instant disclosure.

Reference is made to FIG. 10 which depicts one further embodiment of the wireless Ethernet extension controller, also in view of the another embodiment of the wireless Ethernet extension station shown in FIG. 11.

The wireless Ethernet extension controller 1000 shown in FIG. 10 uses an external power-line network bridge 1010 to connect to a regular AC power electrically. Further, an Ethernet network module 520 is connected with the power-line network bridge 1010. The power line is therefore able to carry the data originally delivered on Ethernet network. The wireless Ethernet extension controller 1000 also provides wireless or wired network connection. The inside devices may be referred to the description of FIG. 5. The controller 1000 provides the wireless networking through the wireless network module 510. The Ethernet network module 520 is prepared for wired connection of network.

FIG. 11 shows a wireless Ethernet extension station 1100 using an external power-line network bridge 1110 connected with a power supply. Relative to the embodiment described in FIG. 6, this wireless Ethernet extension station 1100 externally has the power-line network bridge 1110. The shown Ethernet network module 620 is also provided for various selections of installation.

The power-line network bridges 1010 and 1110 in accordance with the embodiment are provided to serve the power loop to be a physical media functioning as the regular Ethernet network. The power-line network may advantage the extension device to process data communication over the existed power line rather than the additional Ethernet network design.

Figure 12:
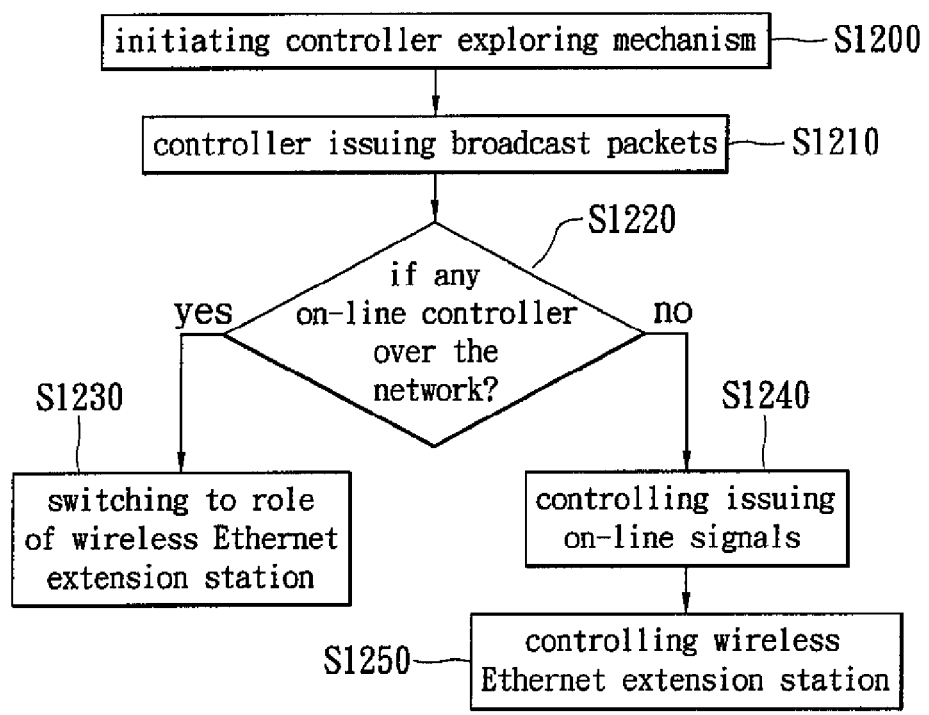
FIG. 12 is a flow chart illustrating to activate the environment including multiple wireless Ethernet extension controllers in accordance with the instant disclosure.

FIG. 12 illustrates a flow of operation among multiple wireless Ethernet extension controllers existed over the same network.

The plug-and-play wireless network extension system exemplarily includes more than one wireless Ethernet extension controller. In particular, the wireless Ethernet extension controller provides a switching mechanism of switching the controller to a controller mode or a station mode. For example, when multiple controllers are disposed within the same power-line network or Ethernet network at the same time, a controller exploring communication mechanism is incorporated to establishing a communication between every two or more controllers. A mode switching mechanism is also introduced to controlling the operational role of the wireless Ethernet extension controller.

For example, when one of the wireless Ethernet extension controllers within the network performs as a major controller, the other controllers may work as the role of the wireless Ethernet extension station by means of automatic switching. As following the steps described in the figure, the controller exploring mechanism of each of the multiple wireless Ethernet extension controllers is firstly initiated (step S1200). After finishing the booting process of the each wireless Ethernet extension controller, the controller exploring communication module (550, FIG. 5) is activated.

Next, such as step S1210, each wireless Ethernet extension controller issues broadcast packets over the power-line network and Ethernet network within the same domain. The broadcast packets are broadcasted to the each wireless Ethernet extension controller. The each controller may thereby inquire if there is any on-line controller exploring communication module over the network (step S1220). The received packets are used to determine the status of the devices, including the status of any on-line controller.

After the initial step of transmitting and receiving the broadcast packets, if it is determined that there is one on-line wireless Ethernet extension controller existed as receiving a response from the on-line controller exploring communication module (yes), it means the one controller (controller exploring communication module) is at on-line status. Meantime, the wireless Ethernet extension controller, which receives the response, may be switched to a mode playing as a wireless Ethernet extension station. Such as step S1230, this controller may work as role of the wireless Ethernet extension station to make the communication.

On the contrary, if there is no any on-line controller exploring communication module to be discovered since there is no response to be received by the controller issuing the broadcast packets (no), it shows the wireless Ethernet extension controller being connected to the network may work as controller and issue an on-line signal in response to the inquiry (step S1240). After that, if any other wireless Ethernet extension controller connected to the network issues the inquiry of any on-line exploring communication module, the controller-mode controller exploring communication module may immediately give a response and show a controller is on-line.

After confirming the on-line controller, the controller exploring communication module may then control the plurality of wireless Ethernet extension stations. Such as step S1250, when the controller exploring communication module is at on-line state, it is in charge of establishing communication among the wireless Ethernet extension stations, including administration and transmitting the wireless network configuration.

The above-mentioned off-line wireless Ethernet extension controllers may periodically process an inquiry to check if the previous on-line controller is changed or failed. Any change may re-initiate any other controller exploring communication module to be activated in order to ensure the normal connection.

According to one further embodiment, a hardware-implemented mode switch is introduced. This mode switch is especially disposed on the wireless Ethernet extension controller, and used to switch the controller to a controller mode or station mode. If two or more wireless Ethernet extension controllers are together installed into one network to be administrated, the mode switch is provided for the administrator manually setting up the operation role of the wireless Ethernet extension controller. Only one wireless Ethernet extension controller is required in one network domain, and the remaining device should be switched to the station mode.

Alternatively, if one existed on-line wireless Ethernet extension controller in the network is acknowledged, the further added wireless Ethernet extension controller may be switched manually to the station mode.

Figure 13:
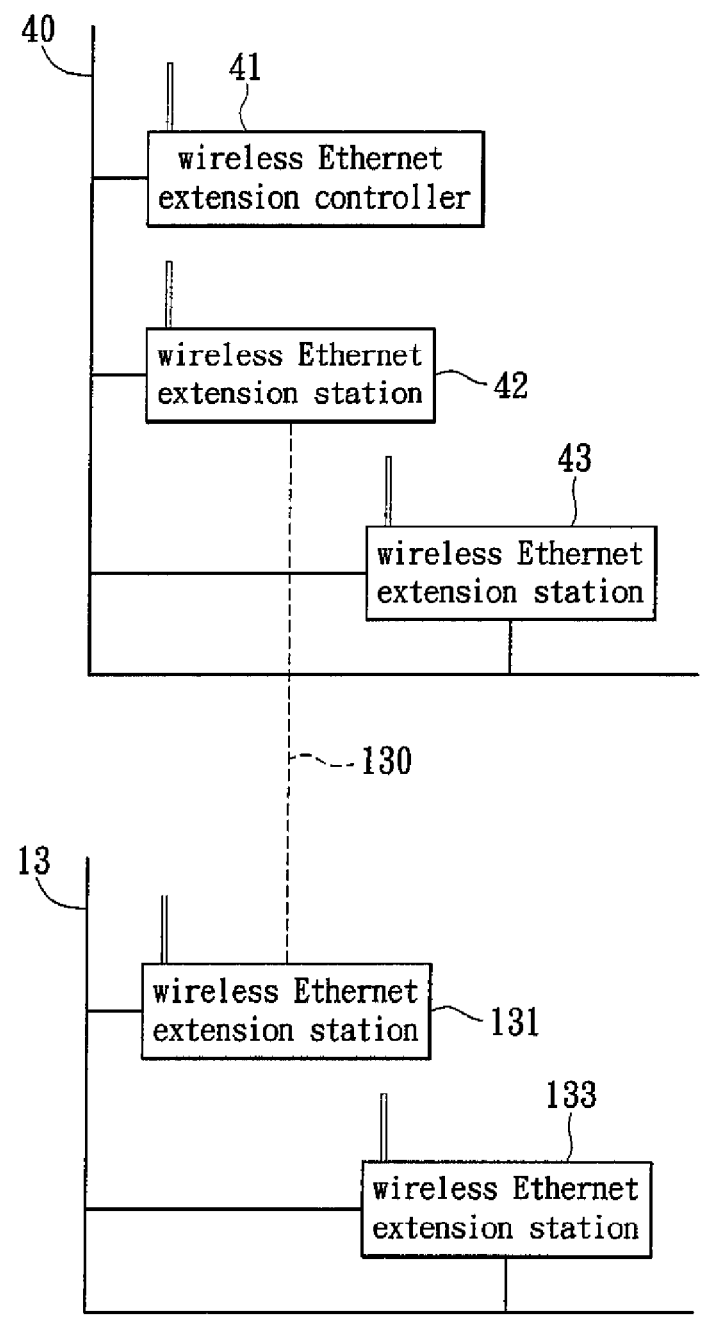
FIG. 13 shows a schematic diagram of the application for the wireless Ethernet extension station in accordance with the instant disclosure.

In accordance with the above network extension mechanism, one more embodiment is shown in FIG. 13. The coverage of the network may be bridged to another power loop in addition to the network ranged over the wired and wireless networks created by the multiple wireless Ethernet extension stations.

In the figure, if one wireless Ethernet extension station is required to be added in the power loop 40, the new station is connected to the power supply of the power loop 40. In the meantime, the station will actively issue exploring packets to acquire the necessary information of the extension controller in the network and the configuration thereof. Further, when the wireless network configuration of the wireless Ethernet extension controller 41 is modified, the controller may automatically deliver the updated configuration to the connected stations according to their network addresses. Under this mechanism, the wireless network configuration for the network can be dynamically modified and kept updated.

The instant disclosure allows the current network coverage to extend one more power loop 13. An Ethernet network line 130 may be used to bridge the two different power loops, especially to bridge the shown wireless Ethernet extension stations (42, 131) in two different power loops. Thus the network signals from the wireless Ethernet extension stations 131, 133 electrically connected with the power loop 13 may be forwarded to every network device within the power loop 40. After that, the devices spread over the whole network can successfully receive the wireless network configuration from the one wireless Ethernet extension controller 41, and perform the configuration.

Furthermore, the wireless Ethernet extension station of the extension system in accordance with the invention may also provide light indicators disposed on its operational panel. Those indicators may show the operational status of each device. Some switches, including buttons or toggle buttons, and the lights may be provided for users simply showing the status of the station. Those indicators may have the following features.

A reset switch may be provided for users re-configuring the station. This switch allows the network configuration forced to be updated. When the user pushes the reset switch, the station exploring communication module of the station will issue a message of requirement of updating. Next, the controller may transmit the wireless network configuration to the station issuing the message. The station-end wireless network module may be configured by itself.

A wireless module shutdown switch may be provided for users switching on or off the function of wireless signaling. For example, the wireless function may be switched off if the users merely use the wired network.

A light indicator may be used to indicate if the wireless Ethernet extension station uses the power-line network. The light indicator may show the intensity of the signals by different colors or light spots for assisting users in determining the status of the power-line network signals.

A controller-connection indicator 904 may be used to indicate whether or not the wireless Ethernet extension station acquires the network address of controller. Colors of the indicator 904 may be used to show the status of the communication according to the acquired network address.

A wireless network configuration indicator 905 may be incorporated to showing whether or not wireless Ethernet extension station receives the wireless network configuration. Colors of the indicator 905 may be used to show the status of reception of the wireless network configuration.

In accordance with the instant disclosure, the wireless Ethernet extension controller may communicate with the each station exploring communication module through its exploring communication module. Then the status of each wireless Ethernet extension station can be acquired. Further, users may use an interface of the user operation and configuration module of the wireless Ethernet extension controller to check if any wireless Ethernet extension station is on-line or off-line. The intensity of the signals over the power-line network may also be checked through the interface.

More particularly, if the network configuration of the controller is caused with any change, the related network configuration may be automatically controller and sent to the every station. The network administrator merely needs to modify the parameters of the configuration of the wireless Ethernet extension controller. Through the controller-end controller exploring communication module, the wireless network configuration of the station exploring communication module may be automatically noticed and updated.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A plug-and-play wireless network extension system, comprising:
   a wireless Ethernet extension controller, comprising:
      a wireless network module providing wireless network access service;
      a controller-end power-line network bridging module, wherein the wireless Ethernet extension controller uses the controller-end power-line network bridging module to connect to a power socket for data transmission over a power-line communication technology;
      a controller exploring communication module, for waiting for an inquiry and request from a network device through the power-line communication technology;
      a user operation and configuration module, providing a management interface for a wireless network configuration;
   one or more wireless Ethernet extension stations, electrically connected to the wireless Ethernet extension controller, comprising:
      a station-end wireless network module for providing wireless network access service;
      a station-end power-line network bridging module, wherein the wireless Ethernet extension station uses the station-end power-line network bridging module to connect to another power socket for data transmission through the power-line communication technology;
      a station exploring communication module, automatically transmitting broadcast packets to exploring a network address of the wireless Ethernet extension controller through the power-line communication technology; and
      an automatic connecting means, automatically performing the wireless network configuration as the one or more wireless Ethernet extension stations are connected with the wireless Ethernet extension controller.

2. The wireless network extension system according to claim 1, wherein the wireless Ethernet extension controller or the each wireless Ethernet extension station further comprises an Ethernet network module for providing a wired connection.

3. The wireless network extension system according to claim 1, wherein the automatic connecting means employs an Ethernet network to bridge the wireless Ethernet extension controller and the one or more wireless Ethernet extension stations.

4. The wireless network extension system according to claim 1, wherein the automatic connecting means employs the power-line communication technology to bridge the controller-end power-line network bridging module and the station-end power-line network bridging module.

5. The wireless network extension system according to claim 4, wherein the power-line network bridging module is a module built in the wireless Ethernet extension controller.

6. The wireless network extension system according to claim 4, wherein the power-line network bridging module is a module externally connected to the wireless Ethernet extension controller.

7. The wireless network extension system according to claim 1, wherein the network address explored by the station exploring communication module is a physical network address or an Internet network address.

8. The wireless network extension system according to claim 1, wherein the wireless Ethernet extension controller employs a mechanism of exploring controller to establish a communication to other controller, and automatically switch to a controller mode or a station mode.

9. The wireless network extension system according to claim 1, wherein the wireless Ethernet extension controller employs hardware to implement a switch for switching the controller mode and the station mode.

10. An automatic connecting method applied over a power-line network for a plug-and-play wireless network extension system including a wireless Ethernet extension controller and at least one wireless Ethernet extension station, comprising:
   connecting the wireless Ethernet extension controller with the at least one wireless Ethernet extension station through a power-line communication technology, the power-line network is therefore established;
   broadcasting broadcast packets over the power-line network by the wireless Ethernet extension station and the wireless Ethernet extension controller;
   the wireless Ethernet extension controller transmitting a wireless network configuration; and the wireless Ethernet extension station automatically performing the wireless network configuration;

wherein, both the wireless Ethernet extension station and the wireless Ethernet extension controller employ the broadcast packets to acknowledge each other's network address.

11. The automatic connecting method according to claim 10, wherein the broadcast packets broadcast from the each wireless Ethernet extension station, and the wireless Ethernet extension controller acknowledges the wireless Ethernet extension station's network address and issues a response.

12. The automatic connecting method according to claim 11, wherein the wireless Ethernet extension station issues a request to the wireless Ethernet extension controller for acquiring the wireless network configuration as issuing the broadcast packets.

13. The automatic connecting method according to claim 12, wherein the wireless Ethernet extension controller transmits the wireless network configuration through broadcast or unicast packets as receiving the request.

14. The automatic connecting method according to claim 10, wherein the network address is a physical network address or an Internet network address.

15. The automatic connecting method according to claim 10, wherein the broadcast packets are sent from the wireless Ethernet extension controller; when the wireless Ethernet extension station acknowledges the network address of the wireless Ethernet extension controller, each of the wireless Ethernet extension controller and the wireless Ethernet extension station issues response.

16. The automatic connecting method according to claim 15, wherein the wireless Ethernet extension controller transmits the wireless network configuration through broadcast or unicast packets after the wireless Ethernet extension controller receives the response from each of the wireless Ethernet extension stations.

17. An automatic connecting method for a plug-and-play wireless network extension system, comprising:
preparing a network environment including a wireless Ethernet extension controller and at least one wireless Ethernet extension station, wherein the wireless Ethernet extension controller and the wireless Ethernet extension station are interconnected through a power-line communication technology, and starting to broadcast packets;
the wireless Ethernet extension station issuing broadcast packets for exploring a network address of the wireless Ethernet extension controller;
the wireless Ethernet extension controller issuing a response as receiving the exploring broadcast packets;
the wireless Ethernet extension station resolves the network address of the wireless Ethernet extension controller as receiving the response from the wireless Ethernet extension controller;
executing a connection process according to the network address;
the wireless Ethernet extension controller transmitting a wireless network configuration stored in a memory to the wireless Ethernet extension station; and
the wireless Ethernet extension station applying the wireless network configuration to setting a wireless network module, including applying a set of wireless network parameters of the wireless network configuration.

18. The automatic connecting method according to claim 17, wherein the step of exploring the network address includes exploring a physical network address or an Internet network address of the wireless Ethernet extension controller.

19. The automatic connecting method according to claim 17, wherein the broadcast packets are carried over a power line bridging the wireless Ethernet extension controller and the wireless Ethernet extension station.

20. The automatic connecting method according to claim 17, wherein, a controller exploring mechanism is initiated if the network environment includes multiple wireless Ethernet extension controllers, comprising:
initiating a controller exploring communication module of the wireless Ethernet extension controller;
each of the wireless Ethernet extension controllers broadcasting broadcast packets according to the power-line communication technology;
each of the wireless Ethernet extension controllers inquiring if any on-line controller exploring communication module is existed in the network environment according to the broadcast packets;
if an off-line wireless Ethernet extension controller discovers the on-line controller exploring communication module, the off-line wireless Ethernet extension controller is switched to function as one wireless Ethernet extension station;
if the off-line wireless Ethernet extension controller determines no any on-line controller exploring communication module is existed, the controller exploring communication module of the off-line wireless Ethernet extension controller issuing an on-line service message; and
the off-line wireless Ethernet extension controller functioned as one wireless Ethernet extension controller, and issuing response to the wireless Ethernet extension station which issued the exploring packets.

* * * * *